Nov. 29, 1966  P. JAMESON  3,288,182
MULTIPLE SPINDLE DRILL
Filed Nov. 8, 1963  4 Sheets-Sheet 1
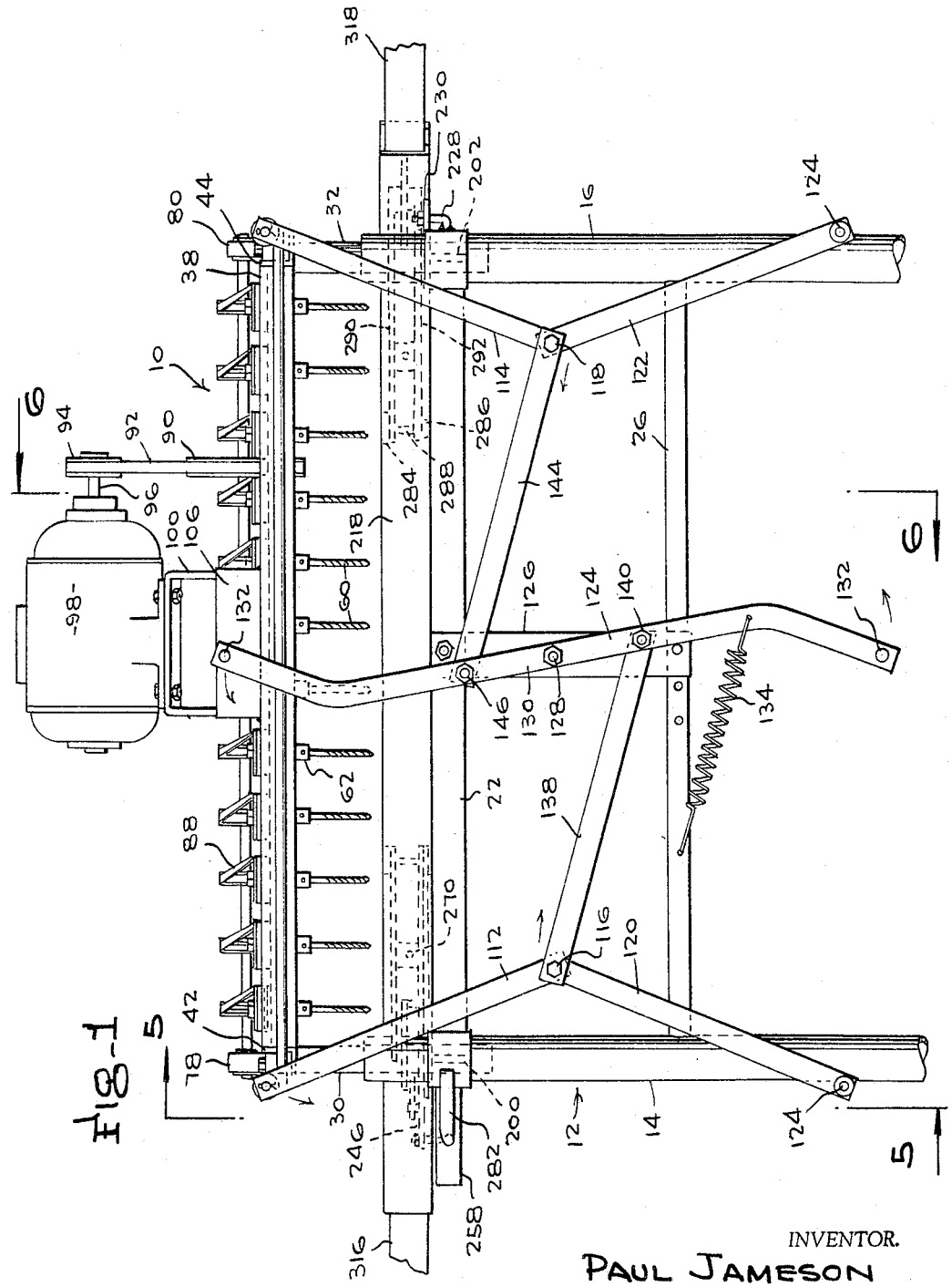
INVENTOR.
PAUL JAMESON
BY
McMorrow, Berman + Davidson
ATTORNEYS

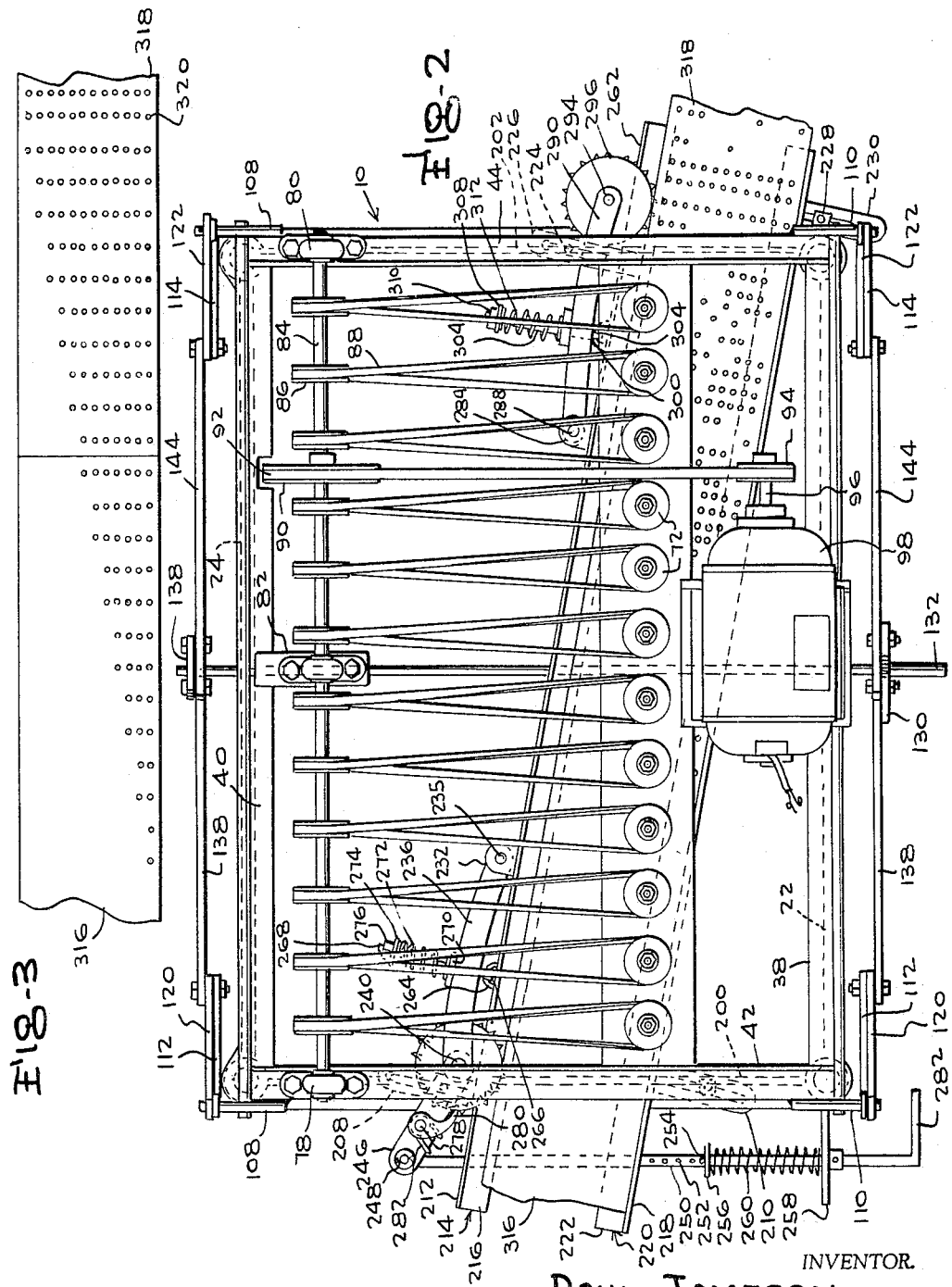

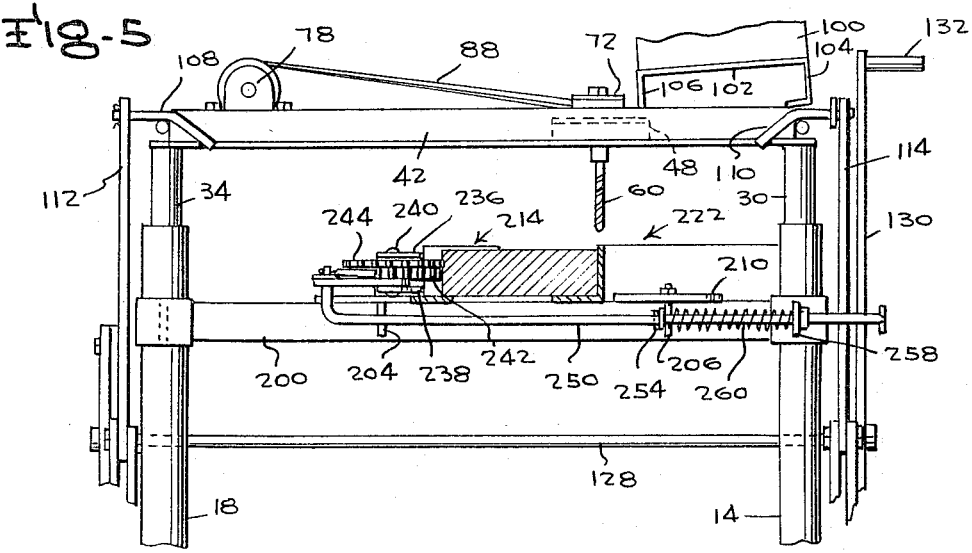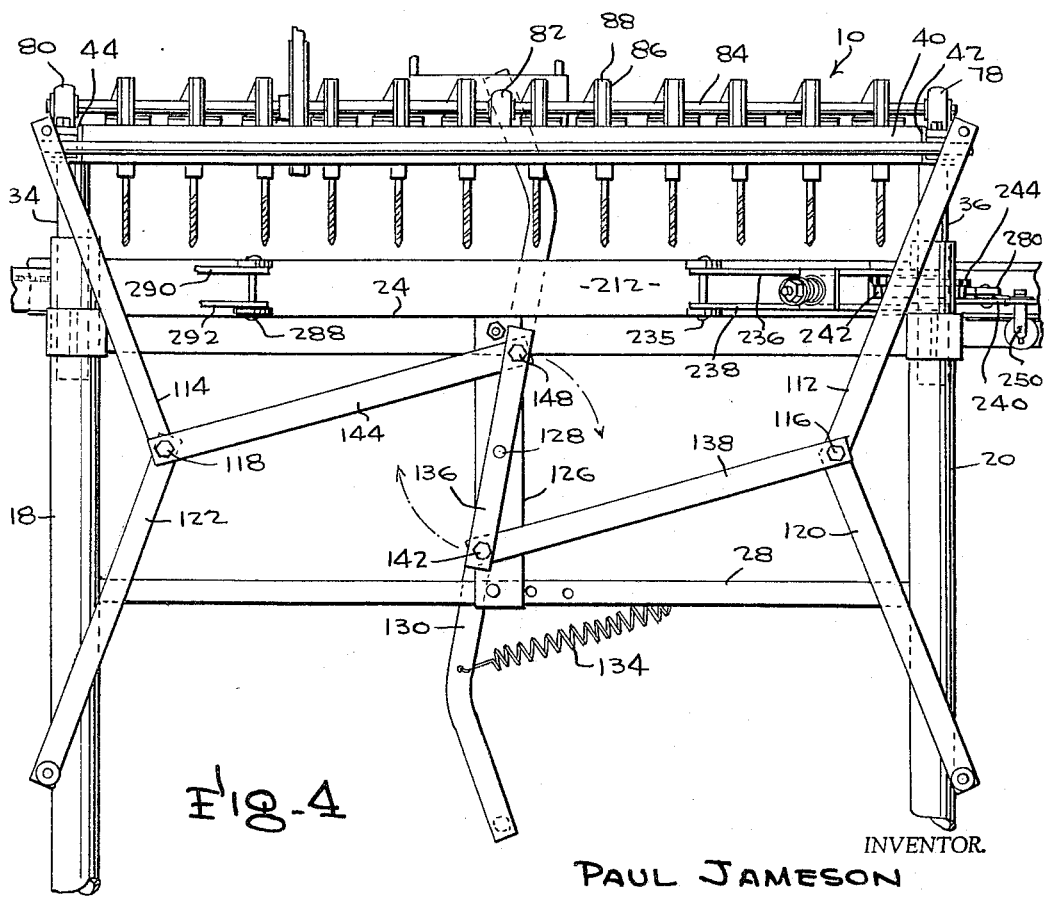

Nov. 29, 1966    P. JAMESON    3,288,182
MULTIPLE SPINDLE DRILL
Filed Nov. 8, 1963    4 Sheets-Sheet 4
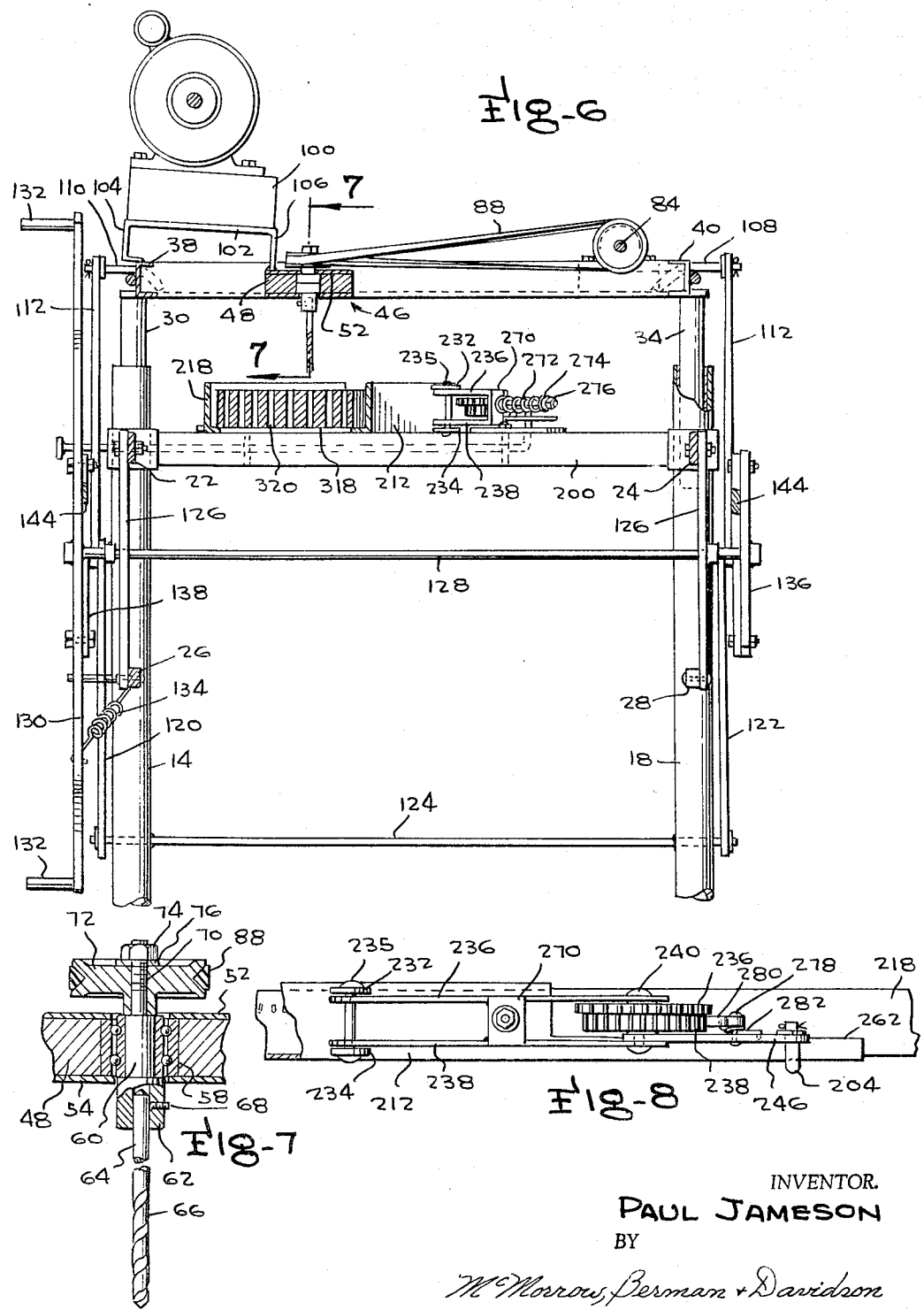
INVENTOR.
PAUL JAMESON
BY
McMorrow, Berman & Davidson
ATTORNEYS United States Patent Office 3,288,182
Patented Nov. 29, 1966

3,288,182
MULTIPLE SPINDLE DRILL
Paul Jameson, Notus, Idaho
Filed Nov. 8, 1963, Ser. No. 322,293
4 Claims. (Cl. 144—110)

This invention relates to the general field of gang tools and, more specifically, the invention pertains to gang means for drilling lumber to provide apertures therein to receive the eggs of leaf cutter bees.

One of the primary objects of this invention is to provide apparatus designed to achieve economy, time and energy essential to perform operations on a workpiece through the provision of a battery of rotating spindles for providing the desired operations.

Another object of this invention is to provide a gang drill for simultaneously drilling a plurality of openings or passages in a workpiece.

Still another object of this invention is to provide a means for feeding workpieces continuously to a gang drill in synchronization with the drilling operations.

A further object of this invention is to provide means for advancing a workpiece below a gang drill for step-by-step advancement therebelow.

It is still a further object of this invention to provide a multiple spindle drill that is comparatively easy to operate, accurate and efficient to use, and which may be operated by unskilled personnel so that the cost of manufacture of articles produced and utilizing this machine may be greatly reduced.

This invention contemplates, as a still further object thereof, the provision of a multiple spindle drill which is non-complex in construction and assembly, relatively inexpensive to manufacture, and which is durable in use.

Other and further objects and advantages of the instant invention will become more evident from a consideration of the annexed drawings when read in conjunction with the following specification, in which:

FIGURE 1 is a side elevational view of a multiple spindle drill constructed in accordance with this invention;

FIGURE 2 is a top plan view of the multiple spindle drill shown in FIGURE 1;

FIGURE 3 is a top plan view of a pair of abutting lumber pieces illustrating the drill work performed by the multiple spindle drill;

FIGURE 4 is a side elevational view opposed to FIGURE 1;

FIGURE 5 is an end elevational view, FIGURE 5 being taken substantially on the vertical plane of line 5—5 of FIGURE 1, looking in the direction of the arrows;

FIGURE 6 is a detail cross-sectional view, FIGURE 6 being taken substantially on the vertical plane of line 6—6 of FIGURE 1, looking in the direction of the arrows;

FIGURE 7 is an enlarged fragmentary detail cross-sectional view, FIGURE 7 being taken substantially on the vertical plane of line 7—7 of FIGURE 6, looking in the direction of the arrows; and FIGURE 8 is an enlarged elevational view of the lumber-feeding means.

Referring now more specifically to the drawings, reference numeral 10 designates, in general, a multiple spindle drill constructed in accordance with the teachings of this invention. As is illustrated in the several figures of the drawings, the multiple spindle drill is seen to comprise a substantially open rectangular frame 12 comprising four vertically-elongated substantially hollow cylindrical support members 14, 16, 18 and 20. Extending between the support members 14, 16 is a cross-brace 22 adjacent the upper ends thereof, and a similar cross-brace 24 extends between the upper ends of the support members 18, 20. Also extending between the support members 14, 16 and 18, 20 are lower crossbraces 26 and 28, respectively.

Telescoped within the upper ends of each of the support members 14, 16, 18 and 20 are reciprocable cylindrical elements 30, 32, 34 and 36, respectively. Extending between and fixedly secured to the elements 30, 32 is a channel-shaped member 38 and a similarly-shaped channel member 40 extends between and is fixedly secured to the elements 34, 36. Angle members 42, 44 extend between and are fixedly secured to the elements 30, 34 and 32, 36, respectively.

Supported between the angle members 42, 44 and fixedly secured thereto intermediate their respective ends is a multiple spindle drill support 46 (see FIGURE 6). The drill support 46 is seen to comprise an elongated substantially rectangular solid bar 48 over which is superimposed a top plate 52. A bottom plate 54 is fixedly connected to the underside of the bar 48, and the bar 48 is formed with a plurality of vertically-extending, longitudinally-spaced aligned cylindrical openings to receive for rotation therein a plurality of longitudinally-spaced aligned bearings 58 in which are received spindles 60 (see FIGURE 7). Each of the spindles 60 is provided with a depending hollow cylindrical boss 62 which is adapted to receive the upper end 64 of a drill 66. The upper ends 64 of the drills 66 are secured in the bosses 62 by means of set screws 68. The upper ends of each of the spindles 60 are reduced in diameter and threaded, as at 70, to receive thereover a pulley 72. Each of the pulleys 72 is held locked to their respective spindles 60 by means of the lock nuts and washers 74, 76.

The assembly is such as to form a bank of drills 66 in longitudinally-spaced relationship relative to the bar member 48.

Reference numerals 78, 80 denote pillow blocks fixedly secured on the angle members 42, 44 adjacent one of their respective ends. A pillow block 82 is also connected to the channel member 24 and is aligned with the pillow blocks 78, 80. The pillow blocks 78, 80 and 82 journal a shaft 84 for rotation therein. As is seen in the several figures of the drawings, the shaft 84 has fixedly connected thereon a plurality of sheaves 86. Reference numeral 88 denotes a plurality of endless belts which are trained about each pair of sheaves 86 and pulleys 72.

Reference numeral 90 designates a pulley mounted on the shaft 84 and connects through an endless belt 92 with the pulley 94 secured on the drive shaft 96 of an electric motor 98. The motor 98 is fixedly secured to an inverted substantially U-shaped support member 100, and the latter is, in turn, fixedly connected to the bight 102 of a second inverted U-shaped channel member. The bight 102 is formed with depending legs 106, 108 which are fixedly secured to the channel member 38 and to the top plate 52.

Reference numerals 108, 110 denote a pair of substantially cylindrical L-shaped rods having one of their respective ends fixedly connected to the opposed ends of the angle member 42. A similar pair of rods have one of their respective ends fixedly connected to the opposed ends of the angle members 44. Each pair of rods 108, 110 is pivotally connected to the upper ends of levers 112, 114, respectively. The lower ends of the levers 112, 114 are pivotally connected, as at 116, 118, with the upper ends of the levers 120, 122, respectively. The lower ends of each pair of levers 120, 122 are connected together by tie rods 124 (see FIGURE 6) and these, in turn, are welded or otherwise fixedly secured to the pairs of support members 14, 18 and 16, 20, respectively.

A pair of elongated substantially rectangular plates 126 are secured to the adjacent pairs of braces 22, 26 and 24, 28, respectively, and extend transversely thereacross intermediate their respective ends. The plates 126 journal for rotation the opposed ends of an elongated shaft 128 which extends beyond the remotely-disposed sides thereof. Fixedly secured to one end of the shaft 128 is an elongated Z-shaped lever 130 having handles 132 fixedly secured to the terminal ends thereof. As is seen in the drawings, one end of a helicoidal spring 134 is fixedly connected to the lever 130 adjacent the lower end thereof and the other end of the spring connects with the brace 26.

An elongated substantially rectangular lever 136 is fixedly secured intermediate its ends to the other end of the shaft 128. Each pair of levers 112, 120 has connected to their pivotal connection 116 one end of a lever 138. As is seen in FIGURE 1, the other end of the lever 138 is pivotally connected at 140 with the Z-shaped lever 130 adjacent its lower end, and in FIGURE 4 the lever 138 is shown as being pivotally connected at 142 with the lower end of the lever 136.

The levers 114, 122 are connected at their respective pivotal connections 118 to one end of a lever 144, and again referring to FIGURE 1 of the drawings, the lever 144 is seen to be pivotally connected at 146 at its other end to the upper end of the Z-shaped lever 130. On the other hand, the lever 144 as shown in FIGURE 4, pivotally connects at 148 with the upper end of a lever 136.

From the foregoing description, it should now be evident that as the lever 130 is rotated in a counterclockwise direction, reference being made to FIGURE 1, the channel-shaped members 22, 24 and the angle members 42, 44 move downwardly on the pairs of elements 30, 32, 34 and 36. As this movement takes place, the drills 66 are moved downwardly in bank.

The bias of the spring 134 assists the operator in returning the drills to their uppermost position.

Reference numerals 200, 202 designate cross-braces which extend between the support members 14, 18, 16 and 20, respectively. Welded or otherwise fixedly secured to the brace 200 are a pair of stud bolts 204, 206 on which are connected longitudinally-slotted flat substantially rectangular adjustable members 208, 210. The adjustment member 208 has one of its ends fixedly connected to the leg 212 of an angle member 214 having a foot section 216. The adjustable rectangular member 210 has an end portion fixedly connected with the leg portion 218 of an angle member 220 having a foot portion 222. A similar stud bolt 224 is secured to the brace 202 intermediate its ends and carries a flat adjustable slotted plate 226 having an end thereof fixedly secured to the leg 212 of the angle member 214. An L-shaped bolt 288 projects laterally and upwardly from the support 16 and adjustably receives thereon a fourth elongated flat substantially rectangular slotted plate 230 having an end fixedly connected to the leg 218 of the angle member 220. The arrangement is such that the angle members 214, 220 may be moved toward and away from one another while still maintaining parallelism.

Reference numerals 232, 234 denote a pair of lugs projecting laterally away from the leg 212 and to which is pivotally connected on pin 235 one end of a pair of arcuate levers 236, 238. The other ends of the levers 236, 238 pivotally support on pin 240, a ratchet wheel 242 and a work-engaging sprocket wheel 244. The ratchet wheel 242 and sprocket wheel 244 are fixed on the pin 240 to rotate with one another. A lever 246 has one of its ends pivotally secured to the pin 240, and its other end is fixedly connected at 248 to one end of an elongated L-shaped rod 250 having a plurality of transversely-extending longitudinally-spaced passages 252 formed therein to selectively receive a backing pin 254 for a stop light 256 mounted on the rod 250. Reference numeral 258 indicates a flange projecting laterally from the support 14 adjacent the upper end thereof and through which extends the rod 250. Interposed between the plate 256 and the flange 258 is a helicoidal spring 260 which surrounds the rod 250 and constantly biases the same for movement toward the lever 246.

The leg 212 is cut away at 262 to receive the sprocket wheel 244 thereover and over the foot portion 214, and the sprocket wheel 244 is constantly biased for movement across the leg 212 by means to be described.

The last-mentioned means include an arcuate element 264 fixedly secured to the leg 212 and projecting laterally therefrom. The eye 266 of an eye bolt 268 is pivotally connected to the arcuate element 264 and the bolt extends between the arms 236, 238 and receives thereon an abutment plate 270 which engages thereagainst. A helicoidal spring 272 surrounds the bolt 268 and is held under compression between the plate 270 and a washer 274, the latter being held in place by means of a nut 276.

A pivot pin 278 pivotally connects one end of a pawl 280 spring-biased at 282 for engagement with the ratchet wheel 242.

The other end of the rod 250 carries a laterally-extending handle 282 to effect actuation of the pawl and ratchet wheel and consequently, of the sprocket wheel 244.

Reference numerals 284, 286 designate a pair of lugs which project laterally from the leg 212 adjacent the other end thereof and through which extends a pin 288. Pivotally connected on the pin 288 are a pair of arcuately-shaped arms 290, 292 between which is pivotally connected on pin 294 an idler sprocket wheel 296. The idler sprocket wheel 296 is adapted to extend across the cut-away portion 262 formed in the leg 212 of the angle member 214.

As before, an arcuate element 300 is fixedly secured to the leg 212 of the angle member 214 and projects laterally therefrom to receive thereon the eye 302 of an eye bolt 304. The eye bolt 304 extends between the arcuate arms 290, 292 and has an abutment plate 306 thereon engaging against the arms 290, 292. The outer end of the eye bolt 304 is capped with a washer 308 which is held against displacement by a nut 310. Interposed between the washer 308 and the abutment plate 306 is a helicoidal spring 312 under compression.

Reference numerals 316, 318 designate two pieces of lumber to be drilled by the drills 66. As is seen in FIGURE 3, the lumber pieces 316, 318 may be placed in abutting relationship relative to one another, whereby a continuous drilling process for each piece may be obtained.

As is seen in FIGURE 2, the angle members 214, 220 form an acute angle relative to the spindle drill support 46 and are laterally-spaced and substantially parallel relative to one another. The lumber piece 318 is first placed on the feet 216, 222 of the angle members 214, 220 and is moved into position below the first of the drills 66 by actuation of the pawl 280 and the ratchet wheel 242. The bank of drills is then depressed in the manner described above to effect the boring of one of the passages 320. The lumber piece 318 is advanced in equal increments along its longitudinal length in accordance with the actuation of the pawl 280 and ratchet wheel 242. The device 10 may be continuously operated since, as shown in FIGURE 3, the lumber pieces 316, 318 may be placed in abutting relation relative to one another and fed continuously to the drills 66 through the pawl and ratchet mechanism 280, 242.

As the lumber 316, 318 is fed through the device 10 from left to right, as viewed in FIGURE 2, the lumber pieces 316, 318 are completely drilled. Each of the drills 66 will drill a row of holes lengthwise of the lumber pieces 316, 318, and the number of passages 320 drilled is determined by the number of drills 66 employed. The longitudinal distance between the holes or passages 320 is determined by the pitch of the gear or ratchet wheel 242, and the distance between the rows across the lumber is determined by the angle at which the angle members 214, 220 is placed with respect to the spindle support 46. An angle greater than the one shown in the drawings would place the pattern of passages 320 on a wider piece of lumber, while a lesser angle would place the same number of rows closer together on a narrower board or piece of lumber.

The angle members 214, 220 are adjustable toward and away from each other through the means described above, whereby pieces of lumber having various widths may be accommodated on the feet 216, 222.

Having described and illustrated one embodiment of this invention in detail, it will be understood that the same is offered merely by way of example, and that this invention is to be limited only by the scope of the appended claims.

What is claimed is:

1. A multiple spindle drill comprising a substantially open rectangular frame comprising a plurality of vertically-elongated substantially hollow support members, a cross-brace extending between each adjacent pair of support members, a cylindrical element telescopically disposed within each of said support members and being reciprocable therein adjacent the upper ends thereof, a channel member extending between a first pair of cylindrical elements a second channel member extending between a second pair of oppositely-disposed cylindrical elements, said cylindrical element being spaced from and substantially parallel with respect to one another, a pair of angle members extending between and securing, respectively, the opposed ends of said channel members, a multiple drill support extending between said angle members and being fixedly secured thereto, a plurality of drills depending from said drill support, a shaft journaled for rotation between said angle members, motor means fixedly supported between said angle members and connected with said shaft and said drills to effect rotation of said drills, and means connected on said frame and with said angle members for effecting reciprocation of said angle members, said channel members, said motor means and consequently of said spindle drill support.

2. A multiple spindle drill comprising a substantially open rectangular frame including a plurality of substantially hollow cylindrical vertically-extending support members, cross braces extending between each adjacent pair of said support members, a cylindrical element telescopically disposed within each of said support members adjacent the upper ends thereof and being reciprocable therein, a substantially channel member extending between and being fixedly secured to a pair of adjacent cylindrical elements, a second channel member fixedly secured to and extending between an opposed pair of cylindrical elements, a pair of angle members extending between, respectively, the opposed ends of said channel members and being fixedly secured to said cylindrical elements and said channel members, an elongated multiple spindle drill support fixedly secured to said angle members intermediate their ends, said drill support housing the spindles of a plurality of drills, each of said spindles having a pulley connected at the upper end thereof, a drill for each of said spindles depending below said support, means releasably securing said drills with their respective said spindles, a shaft rotatably journaled on said angle members and extending therebetween, a plurality of sheaves corresponding in number to the number of pulleys fixedly secured to said shaft for rotation therewith, means fixedly secured on one of said channel members and to said spindle support and connected in driving relation with said shaft to effect rotation thereof, and means mounted on said support members and connected with said angle members to effect simultaneous reciprocation of said angle members relative to said support members and consequently of its associated drill support, sheaves, pulleys and drive means.

3. A multiple spindle drill comprising an open substantially rectangular frame including a plurality of elongated vertically-extending substantially hollow cylindrical support members, a cylindrical element for each of said support members mounted for reciprocation in the upper ends of each of said support members, a first channel member fixedly secured to and extending between a pair of said cylindrical elements, a second channel member fixedly secured to and extending between a pair of cylindrical elements oppositely disposed with respect to said first pair, an angle member extending between the adjacent ends of each of said channel members and being fixedly secured to adjacent cylindrical elements, a shaft extending between and being journaled on the adjacent ends of said angle members, a plurality of sheaves fixedly secured to said shaft for rotation therewith, an elongated spindle drill support extending between said angle members, a plurality of drill spindles disposed within said spindle drill support in longitudinally-spaced relation, each of said spindles having a pulley connected therewith, means connecting each of said sheaves with one of said pulleys, means detachably connecting a drill with each of said spindles, a pulley mounted on said shaft, motor means supported on said first channel member and on said drill support, said motor means including a pulley connected with the drive shaft thereof, means interconnecting said last-named pulley with said pulley mounted on said shaft in driving relationship, brace means extending between each adjacent pair of said support members, means on an opposed pair of said brace means extending longitudinally between said angle members for supporting a piece of lumber below said drills, means on said brace means for advancing said lumber below said drills in longitudinally-spaced equal increments, and means connected with said angle members to effect reciprocation thereof and of said channel members to which they are connected to effect engagement of said drills with said lumber.

4. A multiple spindle drill comprising an open substantially rectangular framework including a plurality of substantially hollow cylindrical support members, a cross-brace extending between and fixedly secured to adjacent pairs of said support members at each end of said frame, a cross-brace extending between each adjacent pair of support members at each side thereof, a second cross-brace extending between each adjacent pair of said support members, said last-named cross-braces being disposed below said first cross-braces, an elongated substantially rectangular plate extending between said first and second cross-braces at each side of said frame, an elongated shaft mounted for rotation in said plates and having ends thereof projecting beyond the remotely-disposed sides thereof, a cylindrical element telescopically disposed within each of said support members and being reciprocable within the upper ends thereof, a channel member fixedly connected at its respective opposed ends to a pair of adjacent cylindrical elements at one side of said frame, a second channel member fixedly secured at its opposed ends to a pair of adjacent cylindrical elements on the other side of said frame, an angle member fixedly secured to said channel members adjacent one of their respective ends and to the adjacent pair of cylindrical elements at one end of said frame, a second angle member extending between and being fixedly secured to the other ends of said channel members and to the adjacent pair of cylindrical elements at the other end of said frame, a pair of laterally-spaced and substantially parallel angle members disposed on said cross-braces at each end of said frame, means connected with said last-named cross-braces to adjust the angularity of said last-named angle members relative to said cross-braces, said last-named angle members being adapted to slidably receive therein an elongated substantially rectangular piece of lumber, means supported on one of said last-named angle members for advancing said lumber longitudinally of said angle members, means mounted on one of said support members and connected with said last-named means to effect the advancement of said lumber in equal increments of distance, journal means connected to an adjacent pair of ends of said angle members, a shaft extending between and journaled for rotation in said journals, a plurality of pulleys fixedly connected to said shaft for rotation therewith, said pulleys being disposed in longitudinally-spaced relation, an elongated spindle drill support extending between and fixedly secured to said angle members, a plurality of drill spindles mounted within said drill spindle support in longitudinally-spaced relation, each of said drill spindles having an end projecting above said drill support, a plurality of pulleys mounted on each of said projecting ends of said spindles, endless belts connecting said last-named pulleys with said pulleys mounted on said shaft in driving relation, means detachably connecting a drill with each of said drill spindles, an electric motor, said electric motor being mounted on the first of said channel members and on said spindle drill support, said motor having a drive shaft, a pulley mounted on said drive shaft, an endless belt trained about said last-named pulley and with one of said pulleys connected with said shaft, and kinematic means connected with said first shaft and to said last-named angle members to effect reciprocation of said drills toward and away from said lumber.

References Cited by the Examiner

UNITED STATES PATENTS

| | | | |
|---|---|---|---|
| 615,116 | 11/1898 | Van Wagner | 144—110 |
| 1,340,953 | 5/1920 | Gwyer | 77—22 |
| 1,670,731 | 5/1928 | Miller | 144—110 |
| 1,884,752 | 10/1932 | Krueger | 77—22 |
| 1,994,776 | 3/1935 | Lewis et al. | 77—22 |

FOREIGN PATENTS 392,529  3/1924  Germany.

DONALD R. SCHRAN, *Primary Examiner.*